United States Patent [19]

Passmore

[11] 4,034,135

[45] July 5, 1977

[54] RIGID STRUCTURE

[76] Inventor: Michael Edward Anthony Passmore, Mount Pleasant, Chiseldon, Wiltshire, England

[22] Filed: Nov. 20, 1975

[21] Appl. No.: 633,658

[52] U.S. Cl. .............................. 428/184; 428/136; 428/186
[51] Int. Cl.² ...................... B32B 3/10; B32B 3/28
[58] Field of Search ............ 428/72, 114, 73, 136, 428/180, 119, 183, 120, 184, 185, 186, 137, 138, 139

[56] References Cited

UNITED STATES PATENTS

| 3,542,636 | 11/1970 | Wandel | 428/185 |
| 3,574,103 | 4/1971 | Latkin | 428/185 |
| 3,741,859 | 6/1973 | Wandel | 428/186 |

Primary Examiner—William J. Van Balen
Attorney, Agent, or Firm—James C. Wray

[57] ABSTRACT

A rigid structure is made up of two interengaging layers. One of the layers is of a generally corrugated form and has slots in the crests of the layer on one side. The second layer is made up of a series of laminae with slots in one side which fit into the slots in the first layer at an angle thereto and which lock the structure into a rigid unit.

10 Claims, 10 Drawing Figures

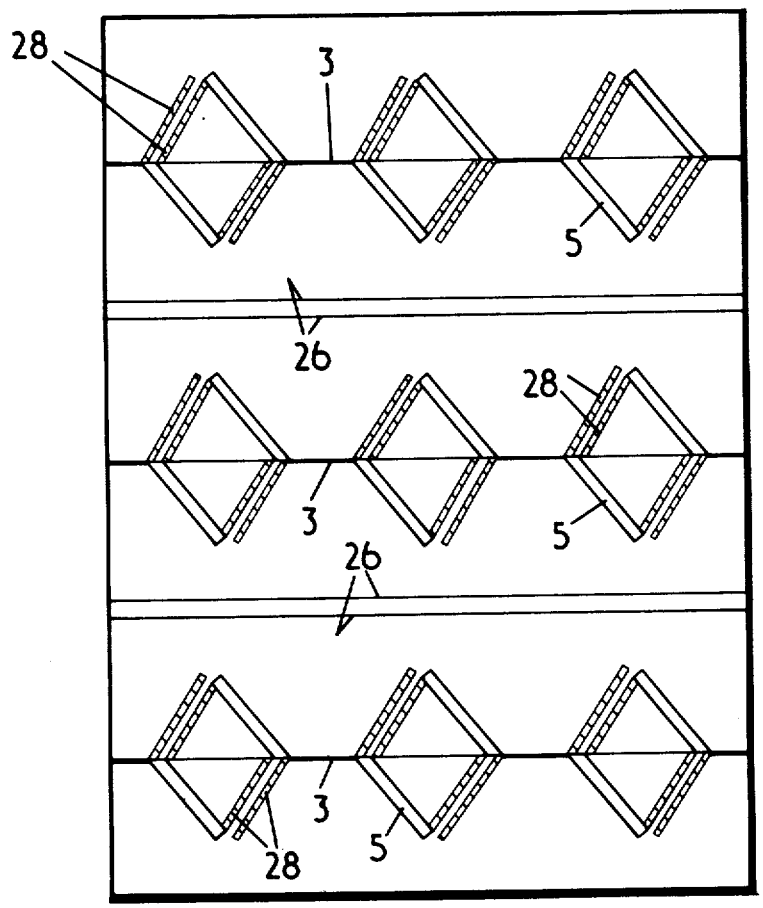
FIG. 8.
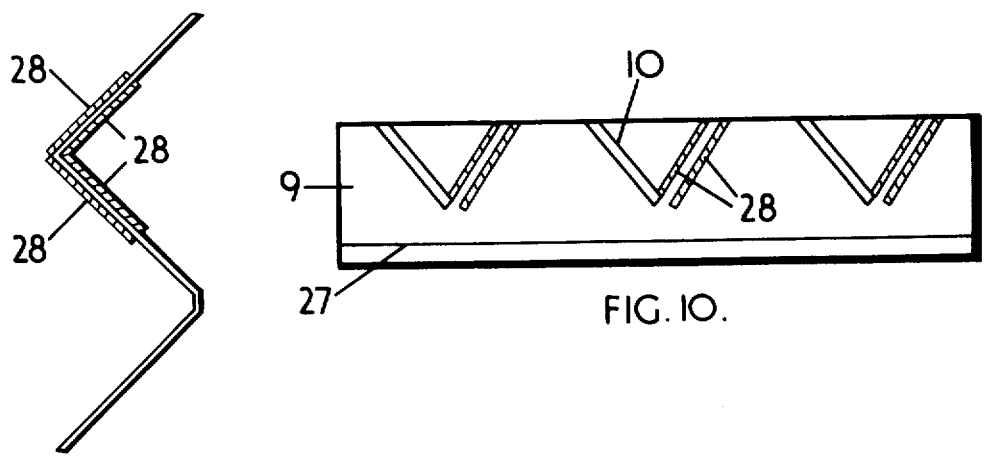
FIG. 9.
FIG. 10.

RIGID STRUCTURE

This invention relates to a rigid structure and to means for creating such structures.

There is a need in industry to provide structures which enable large unsupported spans to be created for example in large halls such as conference halls, and which need the span to be of relatively light construction and of a nature such that it can be readily assembled on site, from easily transportable parts.

In my previous British Pat. Nos. 1,284,452 and 1,371,722 I have described two forms of structure which would be suitable to such structures, and offers a further alternative form of structure which may be advantageous in certain circumstances.

The structure itself is proposed not only to be used in building but in any situation where a flat reinforced strong member is required. Such situations can be found in the packaging and ship building industries where large flat areas are required which have to withstand substantial and uneven pressures. Similarly, piling and bulwarks to prevent earth movement and soil erosion can be useful applications of the invention as can the provision of construction of bridge elements and sub-surfaces of load-distributing nature for motorways, decks for oil rigs, helicopter landing pads and hulls for ships. In each case a strong product can be produced from a relatively weak starting material.

According to the present invention, a rigid structure comprises a first layer of generally corrugated form and a second layer comprising a plurality of laminae arranged across the corrugations of the first layer, the first layer having slots in one side of the corrugated form, the slots extending from the crests of the form on the one side of the said first layer, the laminae having slots therein extending from one edge and disposed as to enable the laminae to engage in the slots in the first layer to lock into the said slots of the corrugation form at an angle to the plane of the structure.

The second layer is preferably of corrugated form and is composed of a plurality of laminae arranged alternately at opposite angles to each other.

The first layer is preferably made from a single sheet of material bent into a continual corrugated form although in an alternative it may be made of separate crests of material either formed of single sheets arranged side-by-side parallel and adjacent to each other or, alternatively, of a number of single sheets parallelly arranged and spaced apart from each other.

The corrugations are preferably triangular in cross section although they may be of any other form and may have curved crests. The crests may be flattened incertain circumstances to provide fixing means. Alternative fixing means may be provided on the lamina by bending a part out of the plane of the lamina so that it lies in the general plane of the structure, in another form a flat surface may be bent out of the material of the separate crests when these are used for the second layer, or separate members may be secured to the material of the layers. Support means for the layers may be secured adjacent the slots.

The slots in the laminae are preferably inclined at an angle to the said one edge and in the developed form the slots in the material of the first layer are preferably disposed at an angle to the parts of the layer forming the crests of the corrugations.

The invention also includes within its scope a blank in the form of a sheet of material form which the said first layer of the material can be formed and including a plurality of parallelly arranged slots spaced apart about a centre line, the slots extending at an angle to the fold line on opposite sides thereof.

Preferably the slots extend at an angle alternatively positioned on each side of the fold line. There may be a plurality of fold lines arranged parallel to each other, each with slots extending on opposite sides thereof and including further fold lines parallel to the said fold lines and between them and the ends of the slots.

The slots may be cut out of the material or punched or stamped or if the material is formed by a moulding process may be originally moulded in the shape of the material.

The structure may be made out of any suitable material such as cardboard, plastics material, wood, metal or reinforced concrete (G.R.C.).

The structure itself may be surfaced on one or both sides by a web which may provide a working surface for the structure. The web may be wrapped around the whole of the structure including the ends.

The component parts of the structure may be secured by any appropriate means such as an adhesive, nails, rivets, welding or brazing according to the type of material used in the structure.

In order that the invention may be fully understood, three embodiments of constructions of a rigid structure and three modifications in accordance therewith will now be described with reference to the accompanying drawings, in which FIG. 1 shows a perspective view of a first structure with one part removed for ease of understanding, FIG. 2 shows a blank from which the first layer of FIG. 1 is made, and FIG. 3 shows a blank from which the second layer of FIG.2 is made.

FIGS. 8, 9 and 10 show respectively blanks from which a modified form of the third embodiment of FIG. 7 can be produced.

Figure 1:
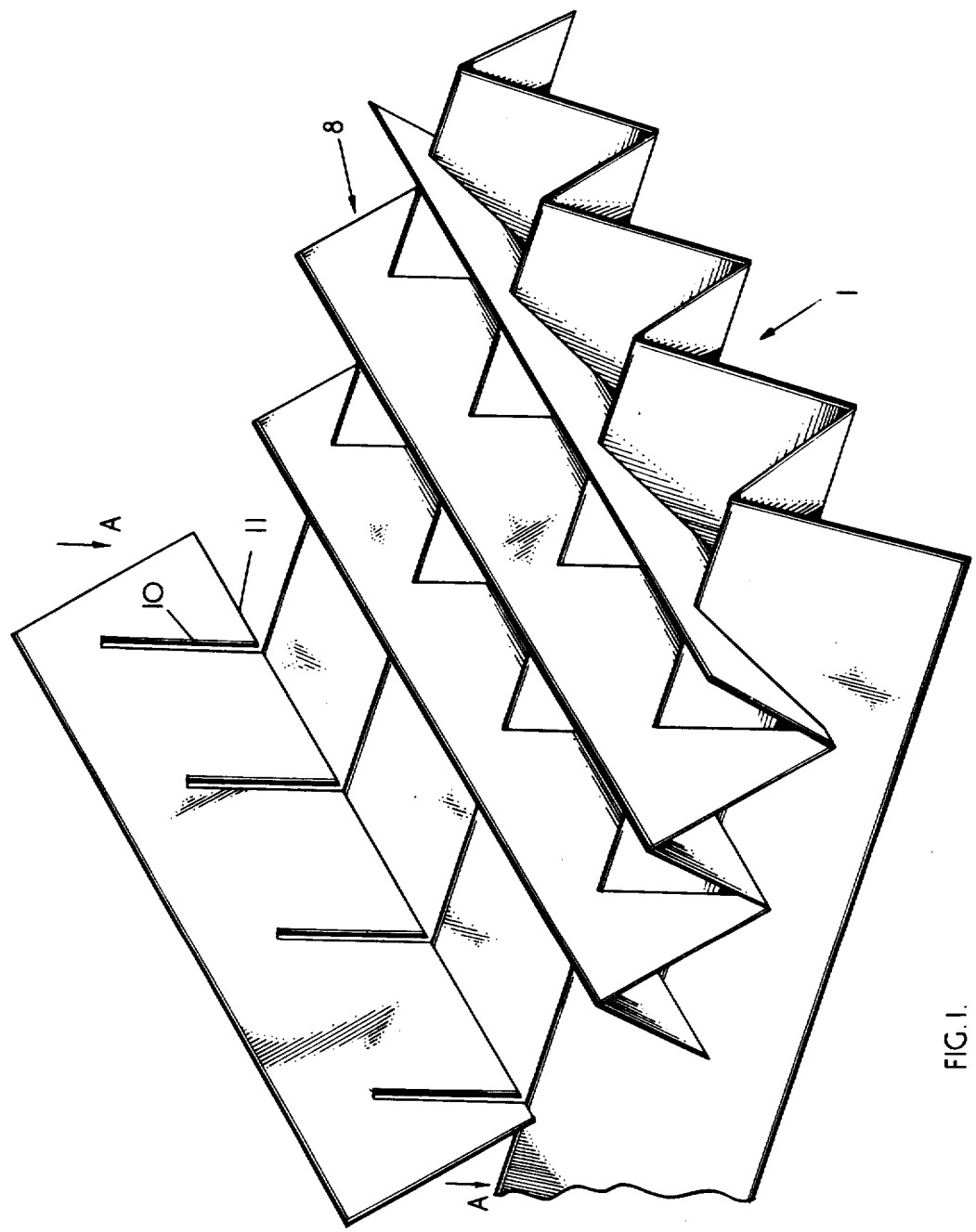

Referring now to the drawings, and particularly to FIG. 1, the rigid structure of the first embodiment comprises two interlocked layers. The bottom or first layer 1 is made up in a corrugated form of equal corrugations by folding a flat sheet 2 of material into equal triangles joined at their crests and bases to the adjacent triangles.

Figure 2:
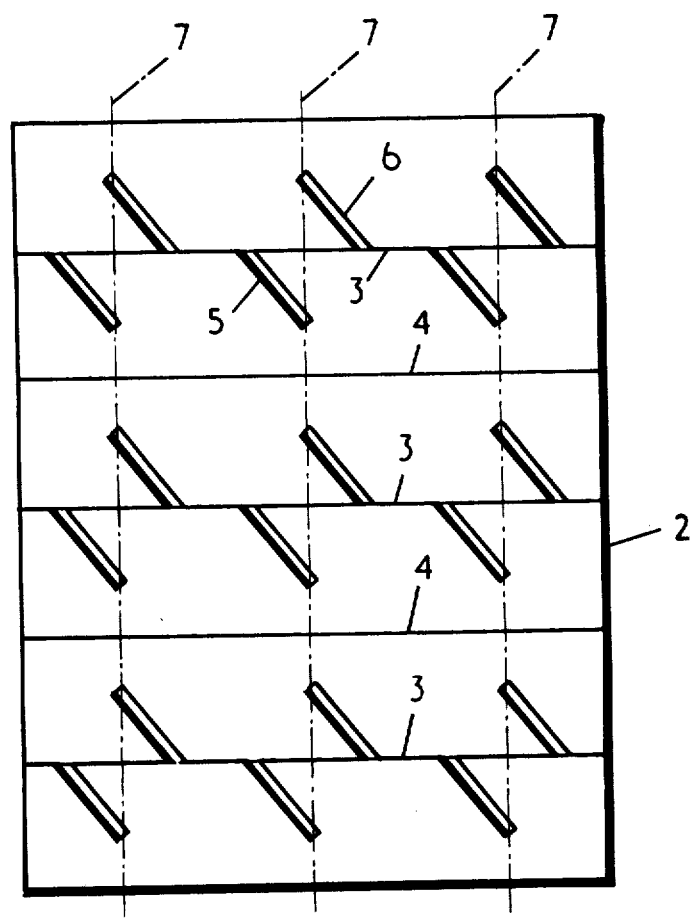

As can be seen from FIG. 2, the first layer in its blank developed form comprises a number of fold lines such as 3 and 4 running across the blank. The fold lines 3 form the crests of the layer and the fold lines 4 the base of the layer. It will be seen that diagonal slots such as 5 and 6 extend from the fold lines 3 alternately on either side of the lines 3 and are inclined at an angle thereto. The slots are equally spaced and as can be seen from the chain and dot lines 7 the closed ends of the slots 5 and 6 of alternate pairs terminate on the lines 7. Thus when the sheet 2 is folded into its corrugated form the result is that sloping slots are presented parallel on the other sides of the crests of the layer and alternately on either side along the length of each corrugation.

Figure 3:
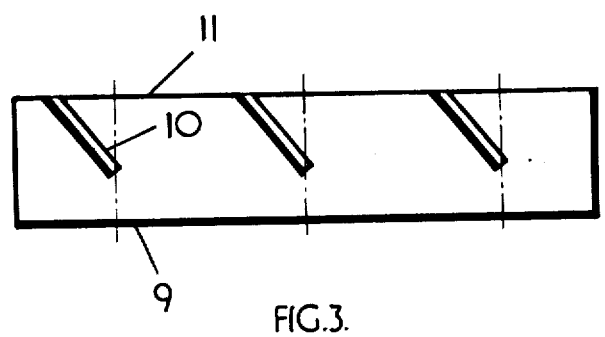

The structure has its top or second layer 8 comprised of a plurality of individual laminae such as 9 as shown in FIG. 3. The laminae 9 are identical for the whole of the layer, the only difference being that alternate laminae are reversed so that slots 10 point alternately in opposite directions.

As can be seen in FIG. 3 the slots 10 extend from one edge 11 only and they are spaced from each other in a similar manner as the slots 5 and slots 6 of sheet 2 are spaced. They are also at the same angle as these slots.

To assemble the structure from the blanks, the sheet 2 of FIG. 2 is folded into its corrugated form along fold lines 3 and 4 so as to form the corrugated first layer as shown in FIG. 1. Laminae 9 are then successively slotted into the slots 5 and slots 6. Because of the inclined angle of the slots 5 and 6 the laminae are disposed at an angle to the plane of the structure and in fact form what is effectively a second corrugated layer interlocking with the first layer. In FIG. 1 one of the lamina 9 is shown above the structure being formed and this lamina moved downwards in the direction of the arrow A to engage over the first layer 1 with the lamina passing into slots not able to be seen on the remote sides of the corrugations of layer 1, but with the slots 10 slipping over the sides of the corrugations which are in view in FIG. 1.

When all the laminae 9 have been slotted into position the structure can be secured in any convenient way. Also by simply securing the structure along the crests of all the triangles on both sides will prevent the laminae from disengaging because of the opposing arrangement of the slots. In this example the structure is made of card and the various components can be secured together by glueing.

Figure 4:
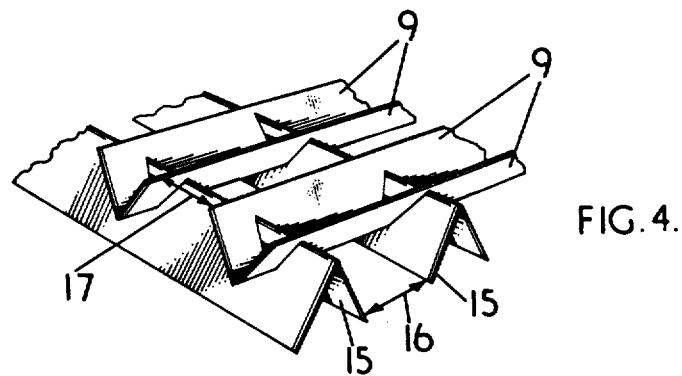
FIG. 4 shows a perspective view of a second embodiment.

Referring now to FIG. 4, this second embodiment is very similar to the first embodiment except that the first or bottom layer is not made from a single sheet of material but is made from triangular members 15 which are arranged parallel to each other and separated by a gap 16. The slots 5, 6 are formed in the sides about the crest of the triangular members 15 and the developed blank is similar to FIG. 2 if it is imagined as consisting only of the part above line 4. It will be noted that the laminae 9 in the top layer are fitted together into triangular formations. These formations are separated by gaps such as 17 which correspond to gaps 16. This embodiment gives a substantial saving in material over the embodiment of FIG. 1 and can be used where overall strength is not of paramount importance.

Figure 5:
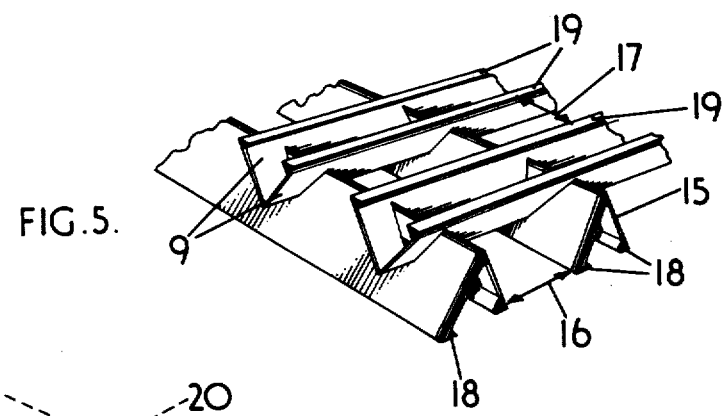
FIG. 5 shows a perspective view of a modification of the second embodiment of FIG. 4.

The above embodiment can be modified as shown in FIG. 5 to accept a support web by attaching triangular fixing members 18, 19 to the outer edges of the members 15 and 9 so as to present flat areas at the top and bottom of the structure to enable support web to be attached.

Figure 6:
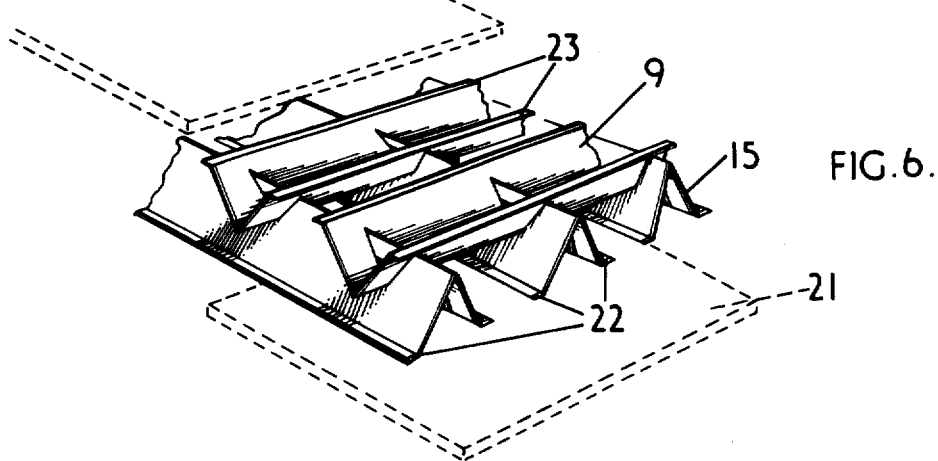
FIG. 6 shows a perspective view of a further modification of the embodiment of FIG. 4 with webs indicated above and below it.

Such webs are shown in the embodiment of FIG. 6 in outline as a top web 20 and a bottom web 21. The webs are made of any appropriate material to provide a flat surface such as a ceiling or decking and can be secured to 18 and 19 of FIG. 5 or to flat support members 22, 23 of FIG. 6 by any suitable method such as glueing or welding. The webs 20 and 21 may be formed from a separate sheet of material wrapped around the whole of the structure. The fixing members 22, 23 of FIG. 6 are simply made in this embodiment by bending over the edges of members 15 and 9 to lie parallel to the general plane of the structure and parallel to the plane of the webs 20, 21.

Figure 7:
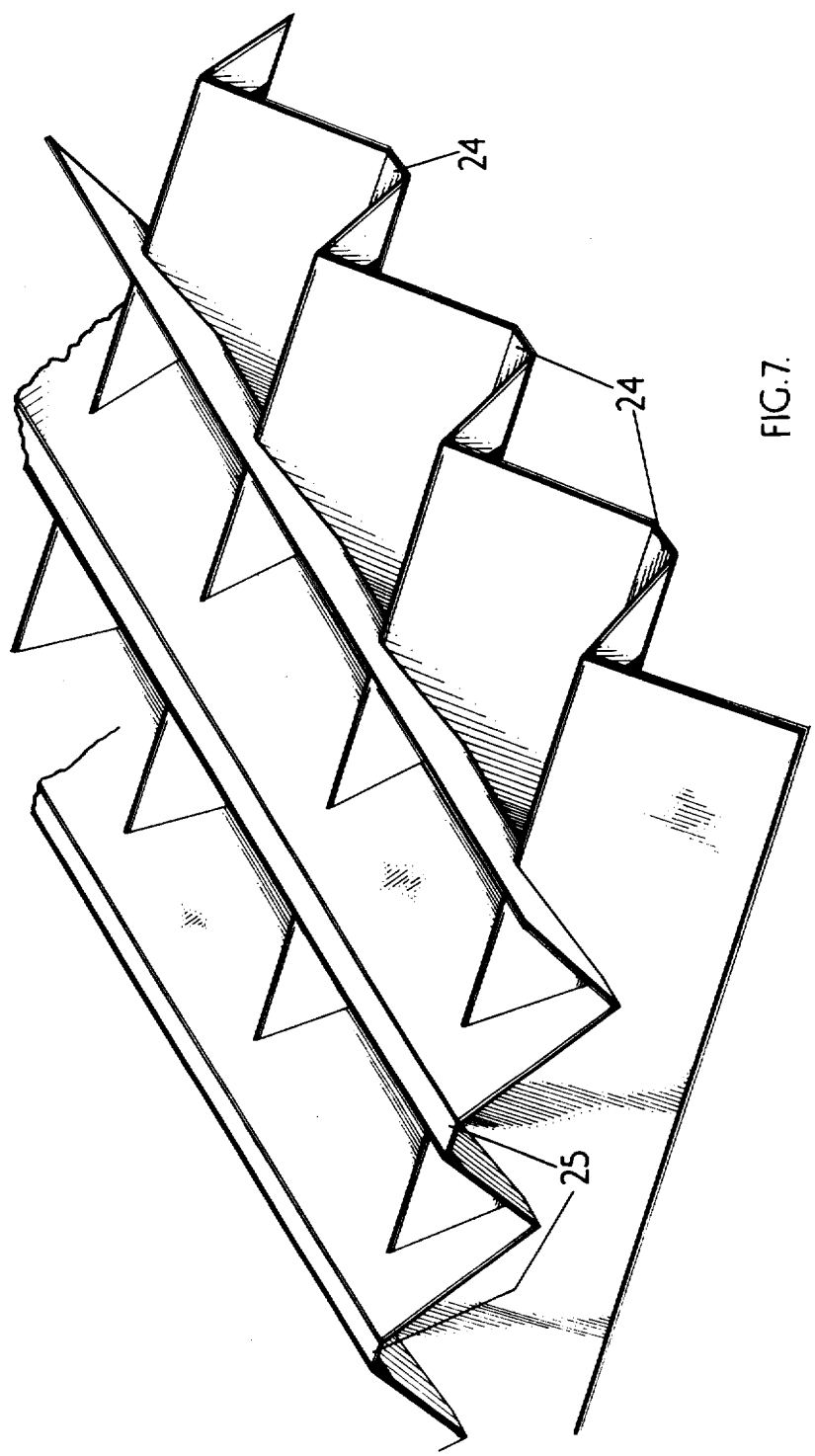
FIG. 7 shows a perspective view of a third embodiment.

Referring now to FIG. 7 this shows an embodiment of the structure adapted for maximum strength and to receive webs such as the 20 and 21 of FIG. 6. The structure is similar to that of FIG. 1 with the variation that flat contact areas 24, 25 are provided on the first and second layers respectively. This is achieved in the first or bottom layer by providing two fold lines as shown at 26 in FIG. 8, equally spaced between the lines 3 and in the top layer by providing a fold line 27 parallel to the unbroken edge of the lamina shown in FIG. 10.

It will be seen from FIGS. 8, 9 and 10 that further strengthening is given to the structure by providing support members 28 adjacent slots 5, 6 and 10 bit at corresponding angles thereto to give support surfaces to the material of the layers when interengaged. The surfaces may also be used for attachment purposes.

The structures produced have been found to have very high I values and to give a greater strength for a given volume of material than other known structures. This enables larger spans to be provided for the same volume of material as previously. Since the top of the corrugations and the spacing of them together with their depth are not critical, the various dimensions can be varied according to the particular design requirements of any structure. Thus in the extreme situation the slots 5 and 6 can be extended from the apex line 3 to the trough line 4 of triangle formed from the blank of FIG. 2. When this is done the stiffness of the resulting structure is increased but the moment of inertia is reduced. It therefore follows that for most applications the best compromise occurs when the apices of the interpenetrating triangles are held as far apart as possible, consistent with a good I value but at the same time giving a modulus of rigidity which prevents buckling of materials in a section under compressive loads.

The invention enables an advantageous load path to be presented along the crests of the corrugations parallel to the troughs in any direction.

Although the two layers have been shown as crossing each other at right angles this not essential and particularly when curved or angled structures are designed the two layers may cross each other at any other convenient angle.

It will be appreciated that the machining operations necessary to provide the blanks for the various layers are simple and may include stamping, pressing and cutting and thus the whole system is economic both in its manufacture and its assembly.

I claim:

1. A rigid structure comprising a first layer of generally corrugated form and a second layer comprising a plurality of laminae arranged across the said corrugations of the first layer, slots being formed in one side of the corrugated form, the slots extending oppositely on opposite sides from crests of the form on the said one side of the first layer, similar slots formed in the laminae, the slots extending from a one edge of each laminae, the said slots in the laminae and the first layer being so disposed whereby the laminae can interengage with the first layer so as to enable the laminae to engage in the slots in the first layer to lock into the said slots of the corrugation form at an angle to the general plane of the structure.

2. A rigid structure according to claim 1 in which the second layer is of a generally corrugated form.

3. A rigid structure according to claim 1 in which the first layer is made up from a plurality of separate crests of material arranged side by side.

4. A rigid structure according to claim 1 in which the crests of the corrugations of the first layer are of generally triangular cross section with flattened apices which lie in a plane parallel to the said general plane of the structure.

5. A rigid structure according to claim 1 in which the laminae of the second layer include fixing means.

6. A rigid structure according to claim 5 in which the fixing means comprises a part of each lamina bent out of the plane of the lamina and arranged to lie parallel to the said general plane of the structure.

7. A rigid structure according to claim 5 in which the fixing means includes separate members secured to the material of the layer.

8. A rigid structure according to claim 1 and including a support web of material secured to a layer.

9. A rigid structure according to claim 8 in which the web is wrapped around the whole of the structure.

10. A rigid structure according to claim 1 and including support members secured to the surfaces of the layers adjacent the slots thereof.

* * * * *